May 7, 1935.  D. A. MURPHY  2,000,346
METALLIC SWING JOINT FOR PIPES
Filed June 13, 1933
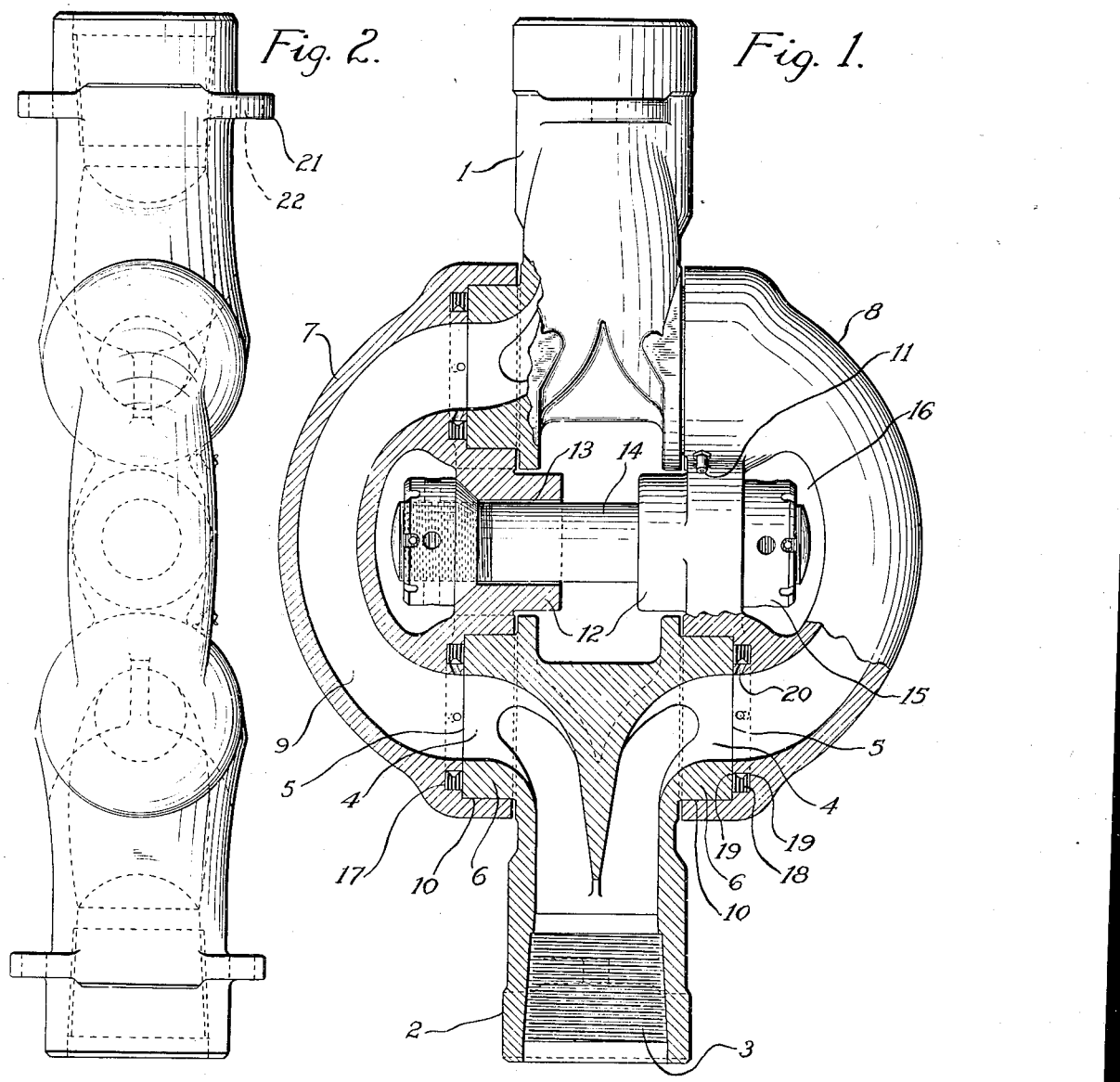
Inventor
Demery A. Murphy Patented May 7, 1935

2,000,346

UNITED STATES PATENT OFFICE 2,000,346

METALLIC SWING JOINT FOR PIPES

Demery A. Murphy, Torrance, Calif., assignor, by mesne assignments, to The National Superior Company, Toledo, Ohio, a corporation of Delaware Application June 13, 1933, Serial No. 675,576

1 Claim. (Cl. 285—18)

This invention relates to metallic swing joints employed for connecting sections of tubular pipe in a fluid tight relation and permitting free oscillation at the joint when the pipe is conveying fluid under high pressures. The invention is directed to an improvement over the metallic swing joint which is the subject of Patent No. 1,920,658, issued August 1, 1933, to applicant and Arthur J. Hodge.

One object of this invention is to provide a swing joint having a pair of symmetrical T-shaped trunnion members with connecting members having curved fluid passages to minimize the turbulence and resistance to flow through the joint.

Another object of this invention is to provide a swing joint having a pressure packed type of seal that is conveniently and readily replaceable.

A further object of this invention is to provide a novel means to secure the connecting members in their respective positions on the T-shaped trunnion members. Other objects of the invention will appear from the following description.

Figure 1 is a front elevation of the swing joint, being partly in cross-section.

Figure 2 is a side elevation of the swing joint.

Referring to the drawing, 1 and 2 indicate two similar T-shaped members having threaded openings 3 for connection with a section of pipe (not shown), said threaded openings communicating with divergent symmetrical passages 4 which terminate on the outer lateral faces 5 of the trunnion portions 6.

Fitting over the trunnion portions 6 and connecting the T-shaped members 1 and 2 are two connecting members 7 and 8, each having a continuous stream line passage 9 communicating with and connecting the passages 4 in the members 1 and 2. Sockets 10 in the members 7 and 8 provide a substantial bearing for the trunnions 6, the said bearing being lubricated through some suitable pressure connection as indicated at 11.

Connecting the ends of each of the members 7 and 8 is a bridge portion 12 having a lateral opening 13 for a double end bolt 14 which secures the members 7 and 8 on the trunnions 6. The bolt 14 is provided with threaded nuts 15 which fit within the openings 16 formed between the bridge portion 12 and the curved passage portion of the members 7 and 8. With the construction thus described, it is possible to make a substantial form of swing joint of the type described which is securely held in assembled relation in a manner that does not affect the free flow of fluid through the joint.

In the bottom face of the socket recess 10 there is provided an annular groove 17 for receiving a pressure packed packing ring 18. The packing ring 18 is preferable of the form shown, having lipped edges 19 which seal against the face 5 of the trunnion 6 and the bottom of the recess 17. Passages 20 convey the pressure of the fluid in the passage 9 to the groove 17 to expand the packing 18.

Lugs 21 having openings 22 are formed on the members 1 and 2 to provide means for connecting a series of swing joints by a wire cable (not shown) for the purpose of preventing any injury to the operators that would otherwise possibly be inflicted if one of the swing joints should fail or become disconnected from its connection.

I claim:—

In a metallic swing joint connection, the combination of a pair of similar swivel members, each having a swivel head at one end formed with outwardly projecting and axially aligned trunnions and having a fluid passage extending therethrough and terminating in a pair of diverging branches opening laterally outward through the faces of the trunnions, a pair of connecting members having bearing sockets fitting over the trunnions and being provided with passages communicating with and connecting the fluid passages in the swivel members, packing means provided between the parallel trunnion faces and the complementary mating face of each bearing socket, said packing means including a packing ring positioned in an annular radially confined groove in one of said faces, said packing ring having radially inward extending lip portions engaging the faces of the trunnion and the bearing socket respectively, means to convey fluid to said groove to expand the packing against said faces and adjustable means securing the connecting members in position on the swivel members.

DEMERY A. MURPHY.